United States Patent
Chen et al.

(10) Patent No.: US 9,906,153 B2
(45) Date of Patent: Feb. 27, 2018

(54) TWO-WIRE NEUTRALLESS DIGITAL DIMMER FOR LEADING-EDGE DIMMABLE LAMP DRIVER AND A METHOD OF OPERATION THEREOF

(71) Applicant: PHILIPS LIGHTING HOLDING B.V., Eindhoven (NL)

(72) Inventors: Shangwu Chen, Wheeling, IL (US); Sreeraman Venkitasubrahmanian, Naperville, IL (US)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 356 days.

(21) Appl. No.: 14/374,068

(22) PCT Filed: Jan. 23, 2013

(86) PCT No.: PCT/IB2013/050569
§ 371 (c)(1),
(2) Date: Jul. 23, 2014

(87) PCT Pub. No.: WO2013/111061
PCT Pub. Date: Aug. 1, 2013

(65) Prior Publication Data
US 2015/0171762 A1 Jun. 18, 2015

Related U.S. Application Data

(60) Provisional application No. 61/590,858, filed on Jan. 26, 2012.

(51) Int. Cl.
*H05B 37/02* (2006.01)
*H05B 33/08* (2006.01)
(Continued)

(52) U.S. Cl.
CPC ......... *H02M 5/2573* (2013.01); *H02M 1/083* (2013.01); *H05B 33/0815* (2013.01);
(Continued)

(58) Field of Classification Search
CPC ...... H02M 1/083; H02M 1/08; H02M 5/2573; H02M 5/25; H02M 5/257; H05B 33/0815;
(Continued)

(56) References Cited

U.S. PATENT DOCUMENTS

| 7,480,128 B2 | 1/2009 | Black |
| 2006/0109702 A1 | 5/2006 | Weightman |

(Continued)

FOREIGN PATENT DOCUMENTS

| JP | 05290983 A | 11/1993 |
| JP | 2003510771 A | 3/2003 |

(Continued)

*Primary Examiner* — Thai Pham

(57) ABSTRACT

A dimmer switch (110-x, 200, 400, 600, 700A, 700B, 1200) adapted to be coupled to an alternating current (AC) source and to a load so as to control an amount of power delivered from the AC source to the load, the dimmer switch may include: a triode for AC (TRIAC) (208, 408, 612) coupled between the AC source and the load, and which when triggered conducts to deliver a controlled amount of power from the AC source to the load for a corresponding half-cycle of one or more half cycles of the AC source. The dimmer switch may include first and second triggering circuits (606, 608) configured to trigger the TRIAC when charged after being enabled. One or more of the triggering circuits may be a self-balancing triggering circuit. The dimmer switch may further include a controller (412, 602, 1210) which selects and thereafter enables one or more of the first or second triggering circuits.

15 Claims, 11 Drawing Sheets

(51) Int. Cl.
*H02M 5/257* (2006.01)
*H02M 1/08* (2006.01)
*H05B 39/04* (2006.01)
*H05B 41/392* (2006.01)
*H05B 39/08* (2006.01)

(52) U.S. Cl.
CPC ....... *H05B 37/0209* (2013.01); *H05B 39/044* (2013.01); *H05B 39/08* (2013.01); *H05B 41/3924* (2013.01)

(58) Field of Classification Search
CPC ............ H05B 33/0818; H05B 33/0809; H05B 33/0803; H05B 33/0806; H05B 33/08; H05B 37/0209; H05B 37/02; H05B 39/044; H05B 41/3924
See application file for complete search history.

(56) References Cited

U.S. PATENT DOCUMENTS

| | | | |
|---|---|---|---|
| 2008/0024074 A1* | 1/2008 | Mosebrook | H05B 37/0209 315/291 |
| 2009/0039854 A1* | 2/2009 | Blakeley | H05B 39/041 323/285 |
| 2011/0121752 A1 | 5/2011 | Newman | |

FOREIGN PATENT DOCUMENTS

| | | |
|---|---|---|
| JP | 2006278061 A | 10/2006 |
| JP | 2009510667 A | 3/2009 |

\* cited by examiner

TWO-WIRE NEUTRALLESS DIGITAL DIMMER FOR LEADING-EDGE DIMMABLE LAMP DRIVER AND A METHOD OF OPERATION THEREOF

CROSS-REFERENCE TO PRIOR APPLICATIONS

This application is the U.S. National Phase application under 35 U.S.C. § 371 of International Application No. PCT/IB2013/050569, filed on Jan. 23, 2013, which claims the benefit of U.S. Provisional Patent Application No. 61/590,858, filed on Jan. 26, 2012. These applications are hereby incorporated by reference herein.

The present system relates to a two-wire digital dimmer and, more particularly, to a digital dimmer suitable for circuits without neutral wires and which can work with a leading edge dimmable lamp driver, and a method of operation thereof.

Recently, light emitting diodes (LEDs) and fluorescent lamps have gained popularity as retrofit lamps in ceiling and/wall fixtures for many reasons including enhanced lifespan, efficiency, and enhanced lighting spectrum. These lamps are often located in ceiling or wall fixtures and are typically connected to circuits which are of two common types: a feed-at-switch (FAS) type or a feed-at-lamp (FAL) type. Both of these circuit types are typically switched on or off by a switch, such as single pole or dimmer switches, mounted in a switch box. These circuits are illustrated with reference to FIG. 1A and FIG. 1B, wherein, FIG. 1A shows a FAL type circuit and FIG. 1B shows a FAS type circuit. With reference to FIG. 1A, line (L) (e.g., hot, source, or main) and neutral (N) conductors extend from a mains wiring 102A into a switch box 104A. From the switch box 104A, the neutral (N) conductor continues to a load 108A via a wall or ceiling junction box 106A. A switch 110A is connected in series with the line (L) conductor and feeds the load 108A so as to enable switching the load on or off. In contrast, in the FAL type circuit shown in FIG. 1B, line (L) and neutral (N) conductors feed from mains wiring 102B directly into a wall or ceiling junction box 106B and the line (L) conductor continues to form a switching loop which extends therefrom to a junction box 104B. A switch 110B is connected in series with the line (L) conductor feeding a load 108B so as to enable switching the load 108B on or off. Comparing junction boxes 106A and 106B, it is seen that junction box 106B does not have a neutral (N) conductor and, is thus, known as a "neutralless" junction box (NJB). While lack of a neutral (N) conduit is usually not an issue when driving incandescent lamps with digitally-controlled switches, it usually is an issue when driving electronic drivers such as LED drivers, fluorescent ballasts (e.g., which drive fluorescent lamps), and the like with digitally-controlled switches such as digitally-controlled dimmers and the like. Accordingly, conventional digitally-controlled dimmers are incompatible with NJBs when driving fluorescent ballasts. This is due to the fact that the impedance of the fluorescent ballasts is usually unstable during start-up. Accordingly, voltage across the ballast may experience an amplitude decrease and/or phase shift. Therefore, conventional digital dimmers cannot accurately detect the zero-crossings of a voltage by monitoring a voltage between line (L) and load (Ld) terminals which may be necessary for proper operation. Further, when in an OFF state, electronic ballasts act substantially as an open circuit and only a very limited current can pass through the ballast. This current can usually be measured for example from several hundred microamps to several milliamps. Accordingly, the power that can be generated using this limited current and provided to internal circuitry of a two-wire switch coupled to an electronic ballast when the switch is in an OFF state is also very limited and is often insufficient to properly run internal circuitry of the two-wire switch.

Accordingly, there is a need for a digitally-controlled dimmer switch which can operate in a "neutralless" circuit and drive a load such as a fluorescent ballast and lamps or the like.

In accordance with an aspect of the present system, there is disclosed a system, method, device, computer program, user interface, and/or apparatus (hereinafter each of which will be commonly referred to as a system unless the context indicates otherwise for the sake of clarity), which discloses a dimmer switch adapted to be coupled to an alternating current (AC) source and to a load so as to control an amount of power delivered from the AC source to the load, the dimmer switch including: a controllable bidirectional semiconductor switch (CBSS) coupled between the AC source and the load and having a control line which, when triggered, configures the CBSS to conduct so as to deliver a controlled amount of power from the AC source to the load for a corresponding half-cycle of the AC source; first and second triggering circuits coupled to the control line and configured to trigger the CBSS; and a controller which: receives sense information related to characteristics of the AC source, the characteristics including information related to one or more zero-crossings for one or more half cycles of a voltage waveform of the AC source, selects one the first or second triggering circuits to be enabled based upon one or more of the sense information, an operational state of the dimmer, and a dimming selection, and/or enables the selected first or second triggering circuit to charge, wherein when the selected first or second triggering circuit reaches a threshold charge, the selected first or second triggering circuit triggers the CBSS to conduct for a corresponding half-cycle of the one or more half cycles and deliver power from the AC source to the load.

In accordance with embodiments of the present system, it is envisioned that the threshold charge is reached substantially when the charge time of the corresponding first or second triggering circuit elapses. Further, it is envisioned that the charge time for each for each of the first and second triggering circuits is different from each other. Moreover, the dimmer switch may include only a source line coupled to the AC source and a load line coupled to the load as an input and an output of the dimmer switch, respectively. Accordingly, the dimmer switch would have only a single input and a single output. Further, it is envisioned that the dimmer switch may include a common capacitor coupled to both of the first and second triggering circuits, wherein when charging, the first and second triggering circuits further charges the common capacitor.

It is also envisioned that the controller may select the first or second triggering circuit in accordance with an operational state of the dimmer switch. Further, it is envisioned that one or more of the first and second triggering circuits may include a self-balancing triggering circuit.

In accordance with yet another aspect of the present system, there is disclosed a method of operating a dimmer switch coupled to an alternating current (AC) source and a load so as to control an amount of power delivered from the AC source to the load, the method including acts which are performed by processor, the acts including: receiving sense information related to characteristics of the AC source, the characteristics including information related to one or more zero-crossings for one or more half cycles of a voltage waveform of the AC source; selecting the first or second triggering circuits based upon one or more of the sense information, an operational state of the dimmer, and dimming selection; and/or enabling the selected first or second triggering circuit to charge, wherein when the selected first or second triggering circuit reaches a threshold charge, the selected first or second triggering circuit triggers the CBSS to conduct for the corresponding half-cycle of the AC source and deliver power from the AC source to the load.

It is also envisioned that the threshold charge may be reached substantially when the charge time of the corresponding first or second triggering circuit elapses. Moreover, the charge time for each for each of the first and second triggering circuits is set to be different from the other. Further, the act of enabling the selected first or second triggering circuit to charge further may include an act of modulating the enabling in accordance with one or more of the sense information, an operational state of the dimmer, and the dimming selection. Moreover, the method may include an act of disabling the triggering circuit which is not the selected triggering circuit of the first and second triggering circuits. It is envisioned that the method may include an act of determining a selected dimming state of first and second dimming states in accordance with the dimming selection. The dimming selection may be entered by a user or may be received from a lighting controller (e.g., using a wired or wireless transmission method). It is further envisioned that the method may include an act of selecting one of the first and second triggering circuits in the first dimming state and selecting the other of the first and second triggering circuits in the second dimming state.

In accordance with yet another aspect of the present system, there is disclosed a computer program stored on a computer readable memory medium, the computer program configured to operate a dimmer switch coupled to an alternating current (AC) source and a load so as to control an amount of power delivered from the AC source to the load, the computer program may include: a program portion may be configured to: receive sense information related to characteristics of the AC source, the characteristics including information related to a zero-crossing of a voltage waveform of the AC source; select the first or second triggering circuits based upon one or more of the sense information, an operational state of the dimmer, and user input information; and enable the selected first or second triggering circuit to charge, wherein when the selected first or second triggering circuit reaches a threshold charge, the selected first or second triggering circuit triggers the CBSS to conduct for the corresponding half-cycle of the AC source and deliver power from the AC source to the load.

It is further envisioned that the program portion may be further configured to receive the dimming selection from a user interface of the dimmer switch. Moreover, the program portion may be is further configured to modulate the enabling of the selected first or second triggering circuit in accordance with one or more of the sense information, an operational state of the dimmer, and a dimming selection. Further, the program portion may be further configured to disable the triggering circuit which is not the selected triggering circuit of the first and second triggering circuits. The program portion also may be configured to determine a selected dimming state of first and second dimming states in accordance with the dimming selection.

In accordance with yet a further aspect of the present system, there is disclosed a dimmer switch adapted to be coupled to an alternating current (AC) source and to a load so as to control an amount of power delivered from the AC source to the load, the dimmer switch may include a controllable bidirectional semiconductor switch (CBSS) coupled between the AC source and the load and having a control line (G) which, when triggered, configures the CBSS to conduct so as to deliver a controlled amount of power from the AC source to the load for a corresponding half-cycle of a plurality of half-cycles of the AC source; first and second triggering circuits coupled to the control line and configured to trigger the CBSS, the first triggering circuit being a self-balancing triggering circuit configured to trigger the CBSS to conduct for a corresponding half-cycle of the one or more half cycles and deliver power from the AC source to the load when the first triggering circuit reaches a threshold charge; and/or a controller which may receive sense information related to characteristics of the AC source, the characteristics including information related to a voltage waveform of the AC source, sense a zero-crossing of the voltage waveform of the AC source for at least one half-cycle of the plurality of half-cycles in accordance with the sense information, determine a delay period for phase cut for the at least one half cycle of the plurality of half-cycles in accordance with the sense information and a dimming selection, determine whether the delay period has elapsed, enable the second triggering circuit to trigger the CBSS for the at least one half-cycle of the plurality of half-cycles when it is determined that the delay period has elapsed, and/or may selectively disable the first triggering circuit.

The invention is explained in further detail, and by way of example, with reference to the accompanying drawings wherein.

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well-known devices, circuits, tools, techniques and methods are omitted so as not to obscure the description of the present system. It should be expressly understood that the drawings are included for illustrative purposes and do not represent the scope of the present system. In the accompanying drawings, like reference numbers in different drawings may designate similar elements.

For purposes of simplifying a description of the present system, the terms "operatively coupled", "coupled" and formatives thereof as utilized herein refer to a connection such as an electrical connection and/or a mechanical connection between devices and/or portions thereof that enables operation in accordance with the present system.

Figures 1A, 1B:
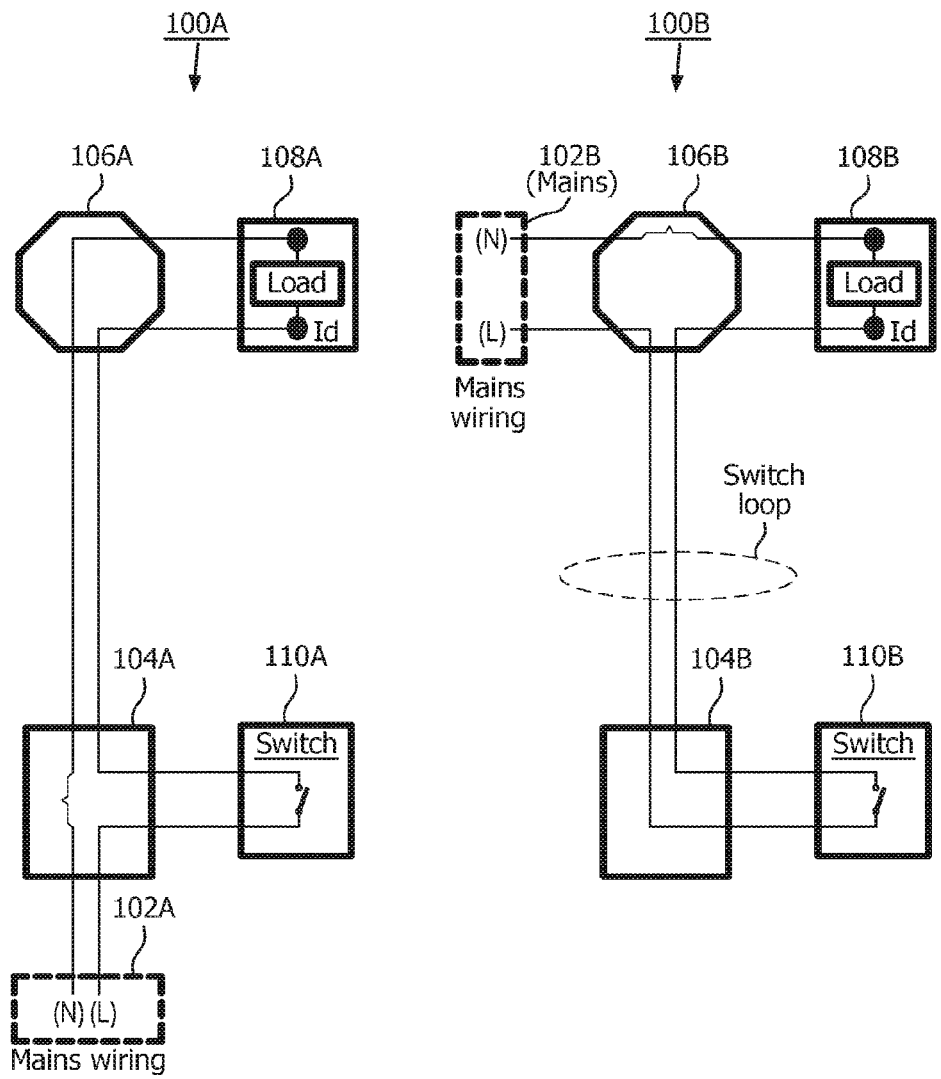
FIG. 1A shows a feed-at-lamp (FAL) type circuit.
FIG. 1B shows a feed-at-switch (FAS) type circuit.

The present system provides a digitally-controlled dimmer which may be compatible with various lamps such as incandescent, fluorescent and/or LED-type lamps and/or lamp drivers such as leading-edge-dimmable lamp drivers, fluorescent ballasts and/or the like. The digitally-controlled dimmers of the present system may provide enhanced operational convenience, control, and/or efficiency. Further, it is envisioned that embodiments of the present system may be compatible with two-wire ("neutralless" type) and three-wire (e.g., including a neutral (N)) lighting circuits such as those shown in FIGS. 1A and 1B.

In accordance with embodiments of the present system, there is disclosed a two-wire digitally-controlled dimmer with analog phase control capabilities. The dimmer uses a controllable bidirectional semiconductor switch such as a TRIAC as a primary switch and is connected in series with a load so as to deliver line (L) voltage (e.g., an alternating current (AC) signal) to the load. When switched "on," the primary switch is controlled so as to cut line (L) voltage during forward phases to decrease the voltage and/or power passed to the load so as to dim the load in accordance with a dimming setting (e.g., full on, high dimming, low dimming, variable dimming, etc.). A triggering circuit includes a resistor capacitor (RC) charger circuit having an adjustable impedance which can be adjusted to control timing of the primary switch with respect to a phase of the line (L) voltage. The dimmer may include an adjustable resistance-type switch such as a potentiometer and/or slider or sliding-interface type switch to adjust the resistance and, thus, impedance of the RC charger circuit. Accordingly, as the impedance of the RC charger circuit controls timing of the primary switch (e.g., for triggering) with respect to phase of the line (L) voltage, it (i.e., the impedance) can be adjusted to adjust power output of the dimmer to the load.

Figure 2:
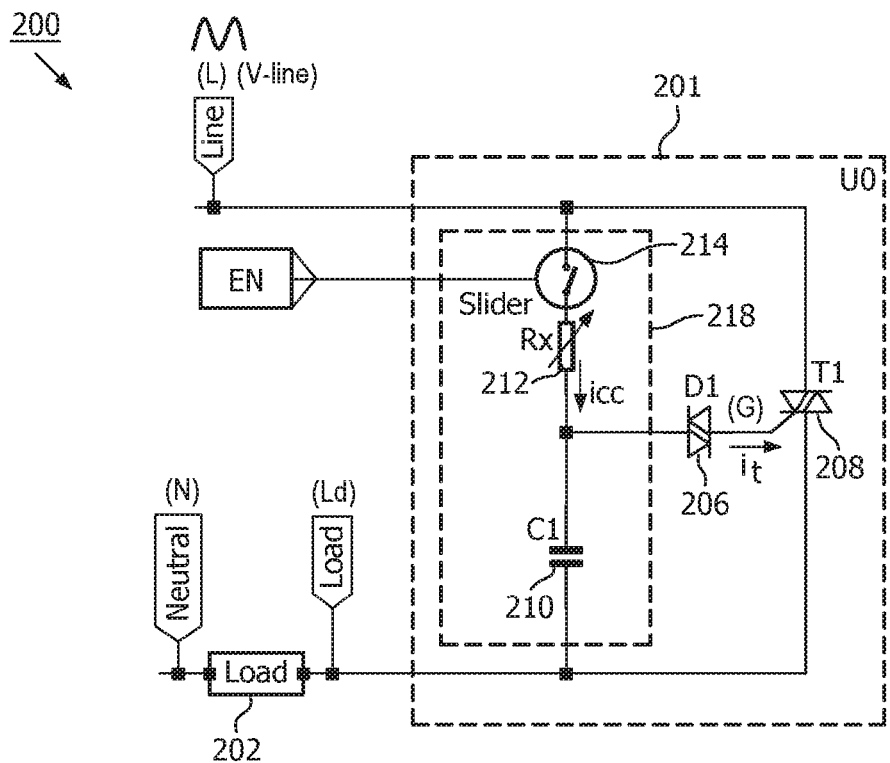
FIG. 2 is a circuit diagram of a portion of an analog triode for alternating current (TRIAC) dimmer in accordance with embodiments of the present system.
Figure 3:
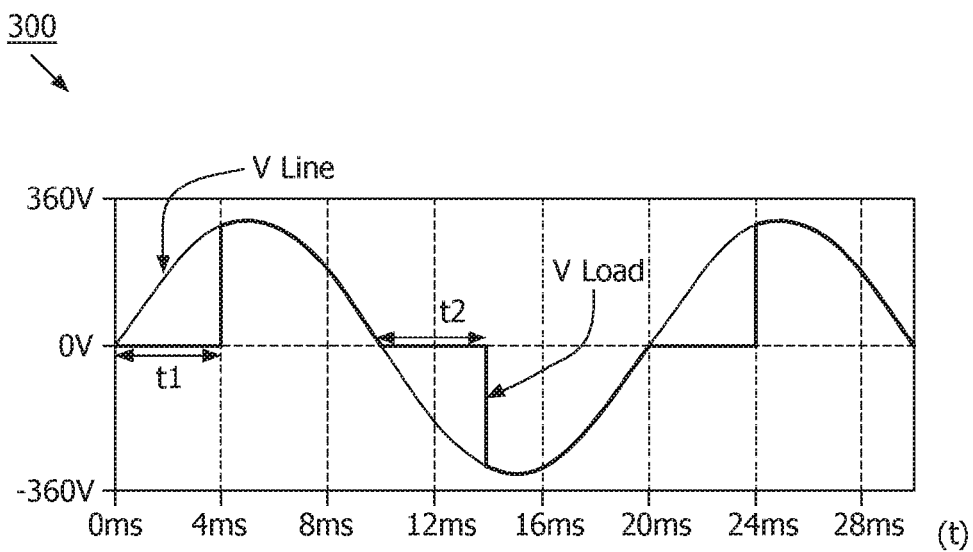
FIG. 3 shows a graph of phase control with respect to line (L) voltage (V-line) for the TRIAC dimmer of FIG. 2 in accordance with embodiments of the present system.

FIG. 2 is a circuit diagram of a portion of an analog TRIAC dimmer 200 in accordance with embodiments of the present system. A graph of input voltage (e.g., line (L) voltage, V line)) vs. output voltage (e.g., V load) for the dimmer (200) of FIG. 2 is shown in FIG. 3.

With reference to FIG. 2, the dimmer 200 is coupled to a load 202 and includes a control circuit 201 having one or more of an RC-charger circuit 218 (hereinafter charger circuit for the sake of clarity), a bi-directional diode for AC (DIAC) 206, and a controllable bidirectional semiconductor switch 208 such as a TRIAC. For the sake of clarity, the controllable bidirectional semiconductor switch 208 will hereinafter be referred to as a TRIAC 208. The DIAC 206 selectively couples a capacitor 210 to the gate of the TRIAC 208 so as to selectively trigger (e.g., fire) the TRIAC 208. The charging circuit 218 includes the capacitor 210 and a resistor such as an adjustable resistor (e.g., a slider) 212 coupled to each other and to the DIAC 206. The capacitor 210 has a capacitance C and the adjustable resistor 212 has a variable resistance Rx that is adjustable to a given desired resistance value. The charging circuit 218 has an RC constant (k) which may be based upon C and Rx for every value of Rx. A charge enable (CE) switch 214 may be used to selectively couple the resistor 212 to the line (L) so as to enable the charging circuit 218 and charge the capacitor 210 to trigger the TRIAC 208. More particularly, when the charging circuit 218 is enabled, the resistor 212 is coupled to the line (L) and a charge current (icc) may pass therethrough to charge the capacitor 210. The resistance Rx of the resistor 212 may be controlled to vary the rate of charge of the capacitor 210. The CE switch 214 may include a control line which may receive a control signal (e.g., (En) such as an enable or dim signal) to controllably open or close the CE switch 214 so as to selectively decouple or couple the charging circuit 218 from the line (L).

It is envisioned that in other embodiments of the present system dimmers may include a plurality of charging circuits each of which may include a corresponding resistor (adjustable or fixed, as desired) coupled to a common capacitor (e.g., 210) and to a DIAC (e.g., 206). Each of these charging circuits may be enabled (e.g., activated) or disabled (e.g., deactivated) in accordance with control signals received from a processor of the system as will be described below in the description of FIG. 6 below. However, for the sake of clarity, only a single RC charging circuit 218 is shown. Further, it will be assumed that the switch 214 is in the closed position at all times during the present description unless the context indicates otherwise.

During operation, when the switch 214 is closed, the capacitor 210 begins to charge during a positive (or negative) half-cycle after a zero-crossing of the line (L) voltage (which is an AC signal received over the line (L)). Thereafter, as the capacitor charges, the voltage across the capacitor 210 will increase until the voltage across the capacitor 210 is equal to, or greater than, a breakover (also termed a breakdown voltage) voltage of the DIAC 206 (such as occurs at the end of a charge time such as t1). Thereafter and while the voltage is over the breakover voltage, the DIAC 206 will conduct and provide a path for the capacitor 210 to discharge a trigger current ($I_t$) to the gate (G) of the TRIAC 208 which in turn will trigger (e.g., fire) the TRIAC 208 to conduct. The conductance of the TRIAC 208 couples the load 202 (and the load terminal (Ld) to line (L) and, thus, across the line (L) and neutral (N) as illustrated by the output voltage (V-load) shown in the graph 300 of FIG. 3. Continuing in the cycle, as soon as a primary current across the TRIAC 208 (e.g., from the line (L) to the load 610)

decreases below its holding value, the TRIAC 208 will open and the load (L) is decoupled from the line (L) completing a half-cycle. During a succeeding half-cycle, the process operates in reverse. For example, after a next zero-crossing, a reverse charge current (e.g., −icc) may charge capacitor 210 during a charge interval t2 (where t2=t1 in the present example) of the current half-cycle. When (an absolute value of) the voltage across the capacitor 210 is equal to, or greater than, (an absolute value of) a breakover (or breakdown) voltage of the DIAC 206 (such as occurs at the end of the current charge time t2), the DIAC 206 will conduct and provide a path for the capacitor 210 to discharge a trigger current ($I_t$) which will trigger the TRIAC 208 as discussed above. This, once again, will couple the load 202 to the line (L) and, thus, across the line (L) and neutral (N) as discussed above. In accordance with embodiments of the present system, the TRIAC 208 is automatically triggered after each charge time has elapsed (e.g., t1 or t2) after zero-crossing of a corresponding positive or negative half-cycle, respectively, thereby providing a controlled amount of power to the load 202. This portion of the dimmer 200 operates as a self-balanced triggering circuit and does not require a specific zero-crossing detection circuit such as a digital zero-crossing detection circuit to fix a starting point of every cycle or half-cycle and/or trigger the TRIAC 208 at a desired phase with respect to a line (L) voltage waveform.

With regard to the charge time (e.g., t1, t2), as this time period is related to the RC constant (k) of the charging circuit, increasing Rx will increase the charge time. Likewise, decreasing Rx will decrease the charge time (t1, t2). Thus, in accordance with embodiments of the present system, to increase the amount of power transferred from the line (L) to the load (Ld), the value Rx may be decreased to decrease the charge time (t1 and t2) which causes the TRIAC 208 to trigger earlier after a zero-crossing of line (L) voltage. Conversely, to decrease the amount of power transferred from line (L) to the load (Ld), the value Rx can be increased to increase the charge time (t1 and t2) which causes the TRIAC 208 to trigger later after a zero-crossing of line (L) voltage.

Moreover, with respect to inputs an in accordance with embodiment of the present system, as the dimmer 200 only requires line (L) and load (Ld) inputs, it may be referred to as a two-input or "neutralless" dimmer.

Figure 4:
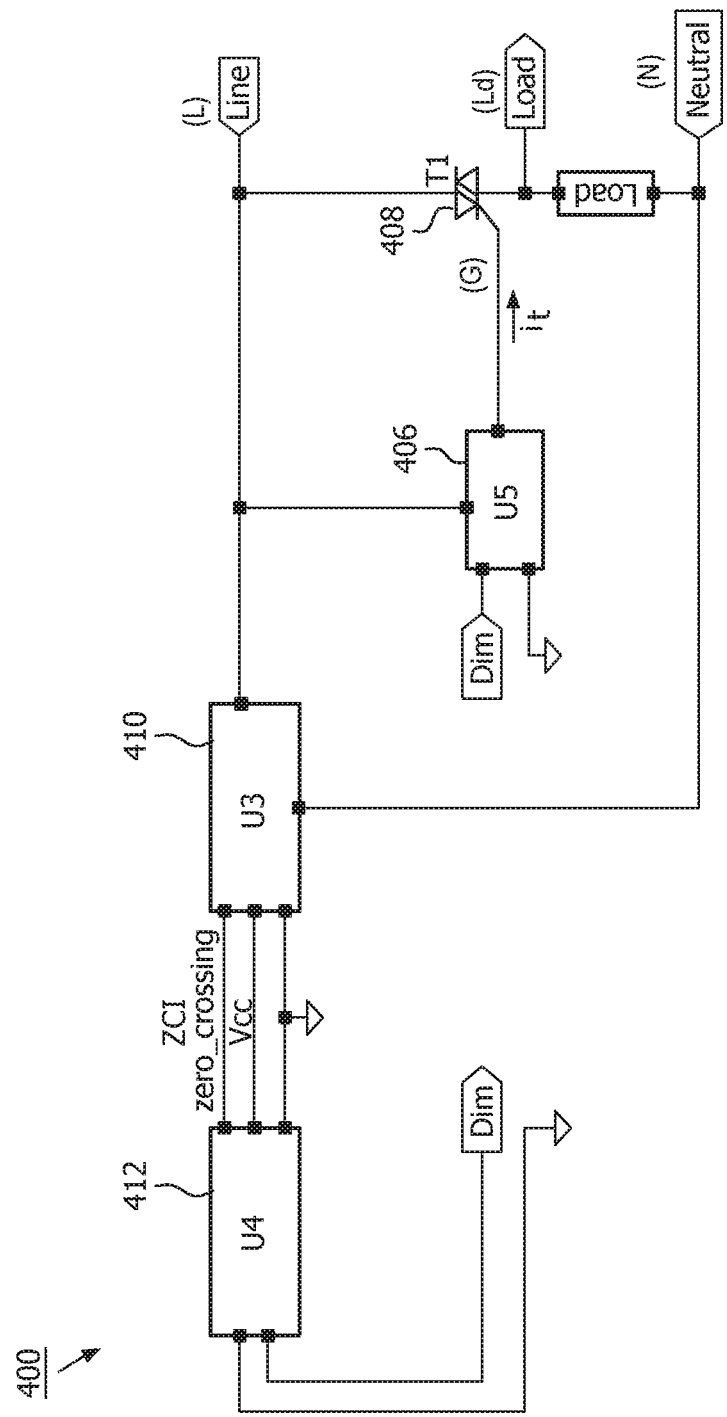
FIG. 4 shows a block diagram of a three-input microprocessor-controlled digital dimmer in accordance with embodiments of the present system.

FIG. 4 shows a portion of block diagram of a three-input microprocessor controlled digital dimmer 400 in accordance with embodiments of the present system. The dimmer 400 includes a zero detection (ZD) circuit 410, a processor 412, a primary switch such as a TRIAC 408 and a triggering circuit 406. In accordance with this embodiment, the triggering circuit 406 may include two or more triggering circuits as discussed further herein. The dimmer 400 is coupled in series with a load 402 and receives line (L) (e.g., including an AC signal) as an input, and a switched output which is fed into the load 402 via a load terminal (Ld). The ZD circuit 410 is coupled to the line (L) and samples characteristics of the line (L) waveform such as voltage, phase, and/or current to determine zero-crossings of the line (L) waveform and forms corresponding zero crossing information (ZCI). Thereafter, the ZD circuit 410 provides the ZCI to the processor 412. The processor 412 may analyze the ZCI and, upon detecting a zero-crossing, may wait for a determined delay period of time (e.g., td) to elapse (e.g., so that a correct phase cut may be achieved), and upon determining that the determined delay period of time (e.g., td) has elapsed, may signal the triggering circuit 406 (e.g., by transmitting a DIM signal) to trigger the TRIAC 408 to couple the load 402 to the line (L). The processor 412 may determine the delay period of time (td) in accordance with a dimming setting (e.g., 50% power, full power, etc.), as may be input by a user or set by the dimmer (e.g., a startup), a current state of the dimmer (e.g., startup), and/or a delay time of a corresponding triggering circuit 406. The processor 412 may repeat this process for each cycle or half-cycle of the AC voltage waveform of the line (L). In this configuration, a zero-crossing is detected by actively monitoring voltage between the line (L) and neutral (N) as opposed to passively monitoring voltage as in the dimmer 200 of FIG. 2. Referring back to the ZD circuit 410, this circuit may further include a separate power supply or may receive power for the dimmer 400 by the couplings between the line (L) and the neutral (N) inputs. Further, the processor 412 may control the overall operation of the dimmer 400 and may include a microprocessor (for signal processing) and/or a user interface (such as keys or switches (hard or soft) for receiving settings from a user and/or rendering information for the convenience of the user). The dimmer 400 may include a plurality of triggering circuits 406 each with a different corresponding delay time and which may be selectively enabled or disabled by the processor 410.

In contrast to the two-wire "neutralless" dimmer 200 of FIG. 2, the dimmer 400 is a three-wire dimmer and requires connection to the neutral (N) input even when off.

Wiring equivalent circuits for two-wire dimmers of FIG. 2 and FIG. 6 will now be discussed with reference to FIGS. 5A and 5B.

Figure 5A:
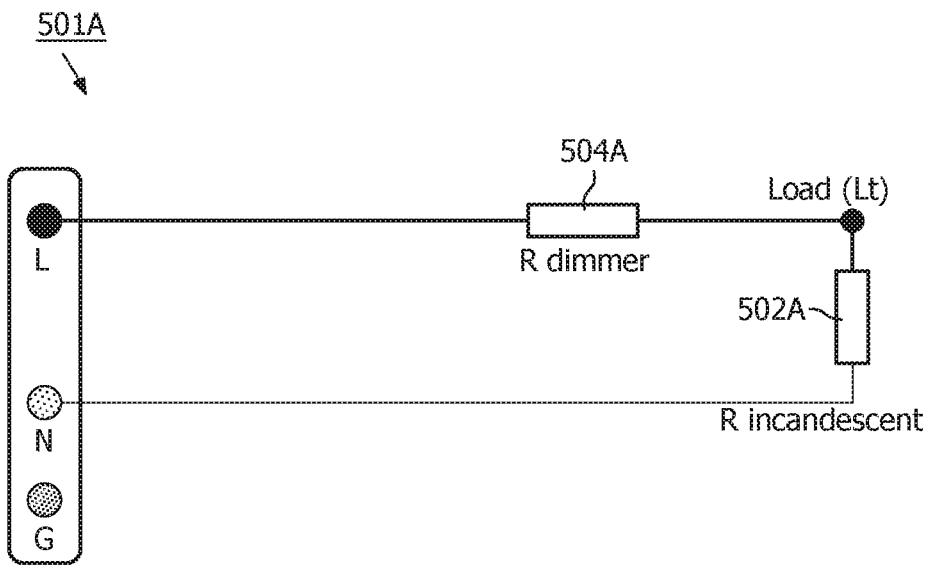
FIG. 5A shows a circuit equivalent of a two-wire microprocessor-controlled dimmer with an incandescent lamp coupled thereto as a load.

FIG. 5A shows a circuit equivalent 501A of a two-wire microprocessor-controlled dimmer 504A with an incandescent lamp coupled thereto as a load 502A. The dimmer 504A and load 502A are coupled in series such that a switched output of the dimmer 504A drives the load 502A. The dimmer 504B has an input coupled to a line (L) and has an impedance R-dimmer. The load 502A is coupled between the switched output of the dimmer 504A and the neutral (N) and has an impedance R-incandescent. Because of a relatively low impedance of an incandescent lamp comprising the load 502A, R-incandescent is very small as compared to the impedance R-dimmer and when the TRIAC dimmer is off, a voltage across dimmer 502A may be considered to be the same as (or substantially the same as) the line (L) voltage of the line (L). Accordingly, when the dimmer 504A is off, its processor may monitor voltage between the line (L) and a load terminal (Lt) as opposed to monitoring the voltage between the line (L) and neutral (N). Further, using this method, amplitude and/or phase of an AC signal at the line (L) can easily be determined.

Figure 5B:
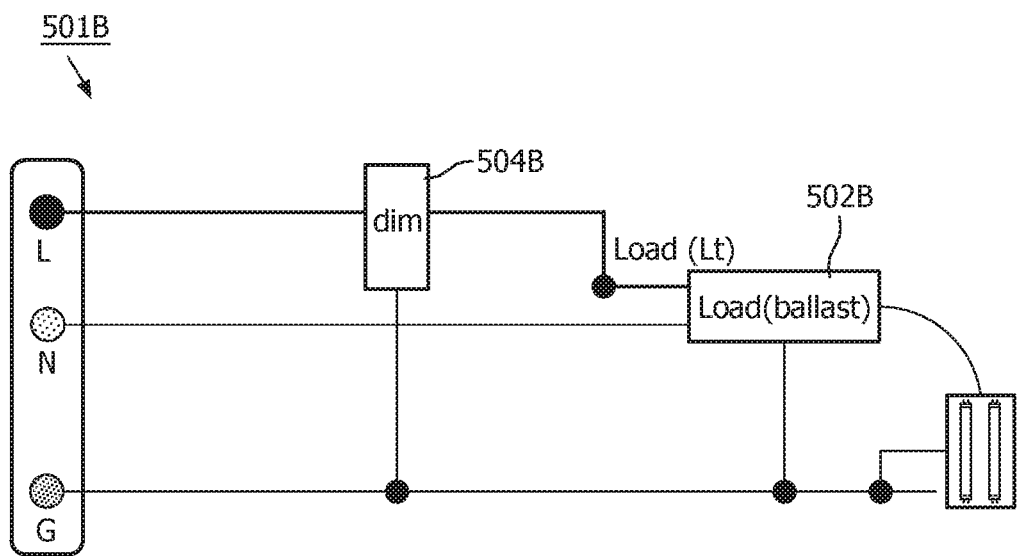
FIG. 5B shows a circuit equivalent of a two-wire microprocessor-controlled dimmer with a fluorescent ballast coupled thereto as a load.

FIG. 5B shows a circuit equivalent 501B of a two-wire microprocessor-controlled dimmer 504B with a fluorescent ballast coupled thereto as a load 502B. The impedance of the fluorescent ballast load 502B is usually unstable during start-up of the load 502B. Accordingly, this circuit may experience an amplitude decrease and/or phase shift of voltage across the dimmer 504B. Therefore, the dimmer 504B cannot accurately detect the zero-crossings by monitoring a voltage between the line (L) and load terminal (Lt) at start-up. Accordingly, the dimmer 504B has trouble accurately determining amplitude and/or phase of the line (L) voltage which is solved by the embodiments of the present system.

Figure 6:
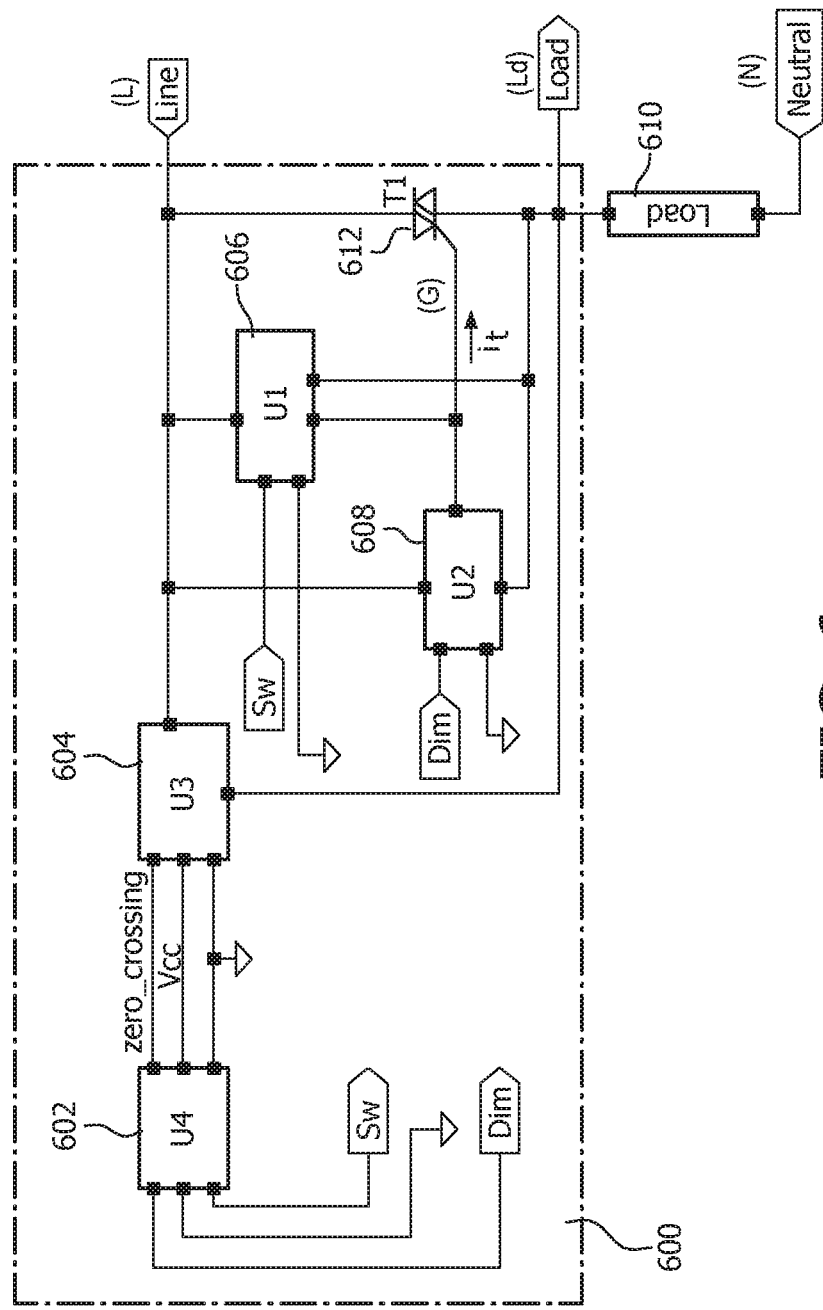
FIG. 6 shows a block diagram of a two-wire input digitally-controlled dimmer in accordance with embodiments of the present system.

FIG. 6 shows a block diagram of a two-wire input digitally-controlled dimmer 600 in accordance with embodiments of the present system. The dimmer 600 may include one or more of a processor 602, a zero-crossing detection (ZC) circuit 604, a bidirectional semiconductor switch such as a TRIAC 612, and first and second triggering circuits 606 and 608, respectively. Each triggering circuit (606, 608) is coupled to a gate (G) of TRIAC 612 and, when enabled, will trigger the TRIAC 612 during a corresponding half-cycle. The dimmer 600 may receive a line (L) input and have a switched output which drives a load 610 (such as a fluorescent lamp) serially coupled thereto. Accordingly, the load 610 is coupled between the switched output of the dimmer 600 and a neutral (N).

The processor 602 may control the overall operation of the dimmer 600 and may include one or more of a microprocessor (μP) for controlling the overall operation of the processor 602, and a user interface (UI) such as a rocker switch, a toggle switch, and/or a push button switch. It is further, envisioned that the UI may include a dimming selector such as a variably adjustable switch with which a user may set a selectable dimming level. Further, it is envisioned that the dimming selector may include a hard- or soft-type switch. For example, in some embodiments, it is envisioned that the dimming selector may be a soft-type switch that is rendered on a touch-screen display of the UI. However, in yet other embodiments, it is envisioned that the dimming selector may be a hard-type switch such as a rotary switch, a sliding switch, etc., and may be integrated with an on/off switch of the dimmer 600. The UI may be operative to receive a command from a user such as an on/off switching command or a dimming command (e.g., entered by manipulating the rocker or push button switch) and process this command accordingly. For example, in response to command to toggle on or off, the processor 602 may form a corresponding switching (SW) and/or dimming (DIM) signals and transmit these signals to corresponding ones of the first and second triggering circuits, 606 and 608, respectively so as to enable or disable the corresponding triggering circuit (606, 608). Accordingly, the processor 602 may sample inputs received from the user (e.g., indicative of a selected dimming level), the ZCI, and/or current state information and may form corresponding switching (SW) and dimming (DIM) signals to control the power delivered to the load 610. Thereafter, the processor 602 may transmit the SW signal to the first triggering circuit 606, and/or may transmit the DIM signal to the second triggering circuit 608. For example, upon detecting that the load has been switched on, ZCI provided to the processor 602 by the ZC circuit 604 may be analyzed by the processor 602 to determine phase, frequency, and/or zero-crossings of the line (L) voltage waveform.

The ZC 604 may be coupled to, and sample the line (L) voltage and form corresponding ZC information (ZCI) which may include information indicative of one or more of a zero-crossing of the line (L) voltage, a frequency of the line (L) voltage, a phase of the line (L) voltage, and an amplitude (A) of the line (L) voltage. Thereafter, the ZC 604 may transmit the ZCI to the processor 602 for further processing. The ZC 604 may further include a power supply to provide power for internal operation of the dimmer 600. For example, the power supply may provide an operating voltage Vcc to the processor 602, etc. Vcc may be delayed for a period of time right after startup (e.g., which occurs when the switch is initially turned "on" from an "off" setting) until it may be output by the power supply. Accordingly, the processor 602 may not sample the zero-crossing signal until it receives Vcc from the power supply. Therefore, the dimmer 600 may include a self-balanced triggering circuit such as the first triggering circuit 606 which may be operated to trigger the TRIAC 612 under certain conditions such as during startup and/or transition phases of operation of the dimmer 600.

The TRIAC 612 is coupled between to the line (L) and the load 610. Accordingly, the TRIAC 612 can switchably couple the load 610 to the line (L) to power the load 610 when the TRIAC 612 is in a conductive state (as may occur when triggered), and can (substantially) decouple the load 610 from the line (L) voltage when the TRIAC 612 is in a non-conductive state (as may occur when its holding voltage drops below a threshold voltage). Thus, when the dimmer 600 is in an "on" state, the TRIAC 612 can switch the line (L) voltage to the load 610 on and off during each half-cycle of an AC signal waveform of the line (L) voltage so as to supply a controlled amount of power from the line (L) to the load 610; and when in an "off" state, the TRIAC 612 can substantially decouple the line (L) voltage from the load 610 so as to turn off power to the load 610.

With regard to the first and second triggering circuits 606 and 608, respectively, the first triggering circuit 606 is operative to trigger the TRIAC 612 at a start-up dimming level (e.g., at minimum power) and the second triggering circuit 608 is operative to trigger the TRIAC 612 at other dimming levels such as at higher dimming levels (e.g., at higher power levels) which may be variable. The startup dimming level may be set to a threshold value (e.g., when the system is configured or in real time) or may be set by the user by, for example, adjusting resistance and, thus, impedance of the RC charger circuit of the first triggering circuit 606. Further, although only two triggering circuits 606 and 608 are shown, in yet other embodiments, it is envisioned that three or more triggering circuits each coupled in parallel between the line (L) and the load (Ld) may be included.

Figure 7A:
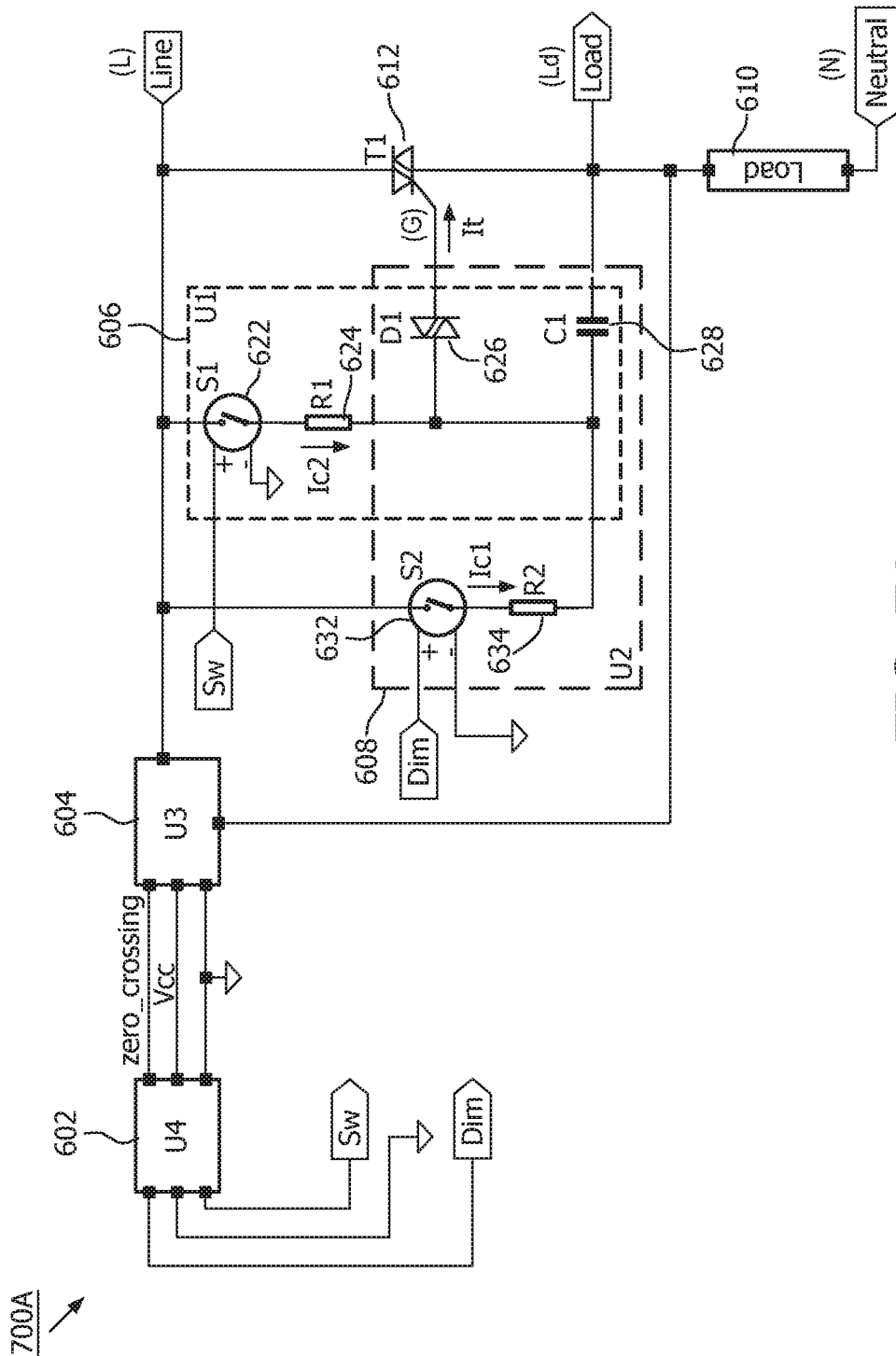
FIG. 7A shows a detailed block diagram of the two-wire input digitally-controlled dimmer in accordance with embodiments of the present system.

FIG. 7A shows a detailed block diagram of two-wire digitally-controlled dimmer 700A in accordance with embodiments of present system. As shown, the first and second triggering circuits 606 and 608 are coupled in parallel to the gate (G) of the TRIAC 612.

Figure 7B:
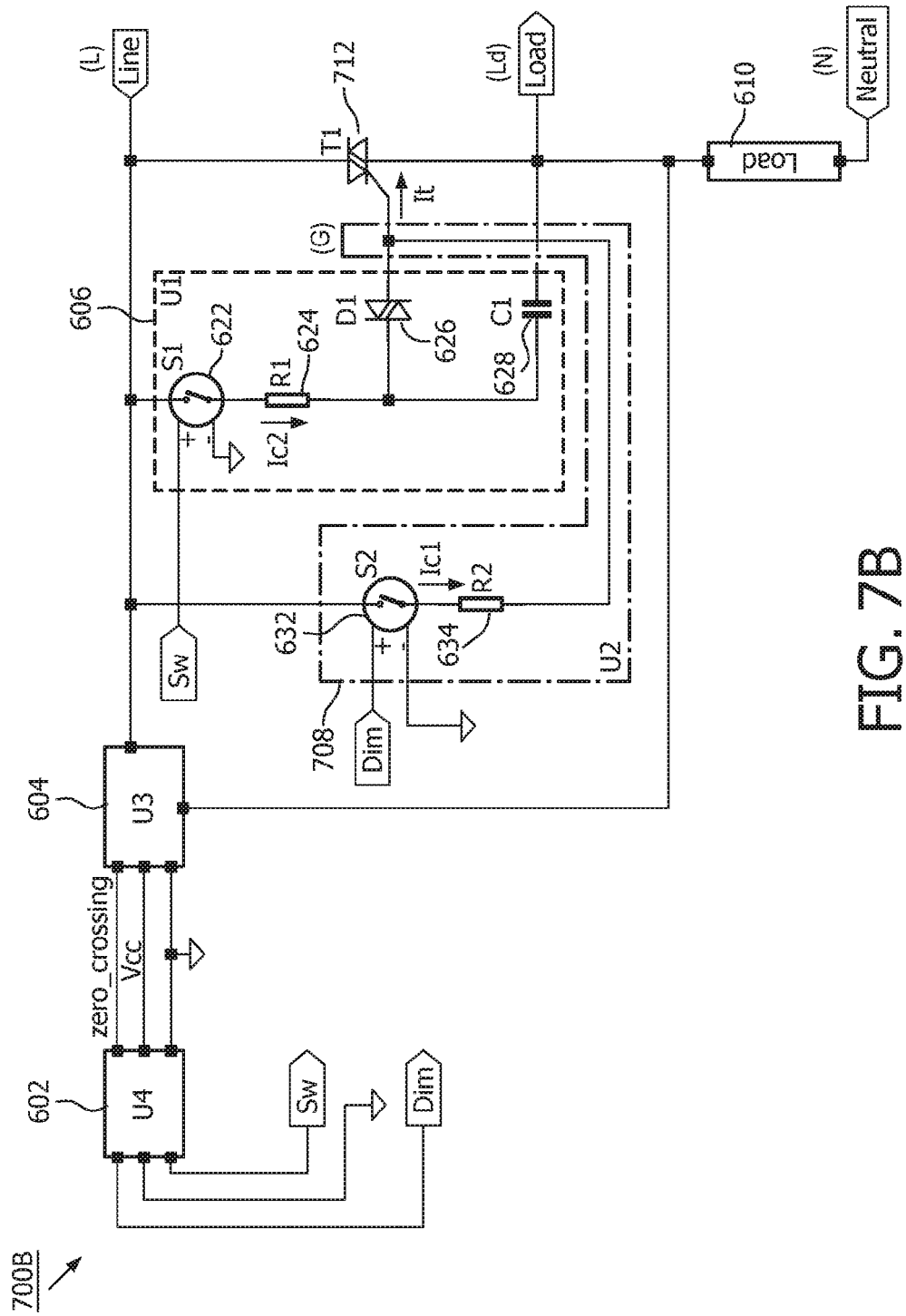
FIG. 7B shows a detailed block diagram of two-wire digitally-controlled dimmer in accordance with embodiments of the present system.

FIG. 7B shows a detailed block diagram of the two-wire input digitally-controlled dimmer 700B in accordance with embodiments of the present system. The dimmer 700B is similar to the dimmer of FIGS. 6 and 7A with a difference being that a second triggering circuit 708 is directly coupled to a gate (G) of a TRIAC 712 without using a DIAC as is illustratively used in the dimmer. As shown, the first and second triggering circuits 606 and 608 are coupled in parallel between the line (L) and the load (Ld).

Referring back to FIG. 7A, the first triggering circuit 606 includes a CE switch 622, a resistor 624, a DIAC 626 and a capacitor 628. The switch CE 622, the resistor 624, and the capacitor 628 are coupled in series between the line (L) and the load (Ld). The DIAC 626 is coupled between a control gate (G) of the TRIAC 612 and both of the capacitor 628 and the resistor 624. The CE switch 622 may include a control line (SW) coupled to the controller 602 which can controllably open or close the CE switch 622 so as to selectively enable or disable the first triggering circuit 606. More particularly, when enabled, the CE switch 622 couples the resistor 624 to the line (L) for receiving a charge current (ic1) from the line (L) and when disabled the CE switch decouples the resistor 624 from the line (L). Accordingly, when the resistor 624 is coupled to the line (L) the first triggering circuit 606 is enabled and when the resistor 624 is decoupled from the line (L) the first triggering circuit 606 is disabled.

The second triggering circuit 608 includes a CE switch 632, a resistor 634, the DIAC 626 and the capacitor 628. The switch CE 632, the resistor 634, and the capacitor 628 are coupled in series between the line (L) and the load (Ld). The DIAC 626 is coupled between the control gate (G) of the TRIAC 612 and both of the capacitor 628 and the resistor 634. The CE switch 632 may include a control line (DIM) coupled to the controller 602 which can controllably open or close the CE switch 632 so as to selectively enable or disable the second charging circuit 608. More particularly, when enabled the CE switch 632 couples the resistor 634 to the line (L) for receiving a charge current (ic2) from the line (L) and when disabled the CE switch 632 decouples the resistor 632 from the line (L). Accordingly, when the resistor 634 is coupled to the line (L) the second triggering circuit 608 is enabled and when the resistor 634 is decoupled from the line (L) the second triggering circuit 608 is disabled.

In the first triggering circuit 606, the resistor 622 and the capacitor 628 may form a first RC charger circuit which has an RC constant (k1) which may be based upon a capacitance (C) of the capacitor 628 and a resistance (R1) of the resistor 622. Similarly, in the second triggering circuit 608, the resistor 634 and the capacitor 628 form a second RC charger circuit which has an RC constant (k2) which may be based upon the capacitance (C) of the capacitor 628 and the resistance (R2) of the resistor 634. As the capacitor 628 is commonly shared between the first triggering circuit 606 and the second triggering circuit 608, the RC values for these circuits (i.e., k1 and k2, respectively) are dependent upon R1 and R2, respectively.

Further, in accordance with embodiments of the present system, the RC constant k1 may be set such that a charge time (Tc1 or $\Delta$1) of the first triggering circuit 606 be set to a determined time, such as for example to about 8 ms (after a corresponding zero-crossing when the corresponding triggering circuit is enabled), and that the RC constant k2 be set such that a charge time (Tc2 or $\Delta$2) of the second triggering circuit 608 is less than Tc1 and preferably much less than Tc1 (Tc2<<Tc1) such as 10 usec i.e., substantially immediately. Accordingly, as Tc1 is dependent upon R1, this resistance should be greater than R2 such that Tc2<<Tc1. Thus, with regard to the second triggering circuit 608, when this circuit is enabled by the processor 602, R2 should be set such that the capacitor 628 is charged in a very short time interval (i.e., almost immediately) so that its voltage immediately exceeds a breakdown voltage of the DIAC 626 thus, causing the DIAC 626 to conduct a triggering current (It) from the capacitor 628 to the TRIAC 612, thereby triggering the TRIAC 612.

As may be readily appreciated, FIG. 7B operates similar to FIG. 7A with the exception that since the second triggering circuit 708 is directly coupled to the gate (G) of a TRIAC 712 such that turn on is immediate.

A method of operation of a dimmer in accordance with embodiments of the present system will now be discussed with regard to operative states. In the present example, four operative states will be discussed: (a) off (b) startup, (c) stead state, (d) low dimming, and (e) high dimming States (b) through (e) may be considered to be "on" states. However, other states are also envisioned. During each of the "on" states, the first and/or second triggering circuits (e.g., 606, 608, 708) are operative to trigger the TRIAC 612 to conduct and transfer power from line (L) to the load 610. When in the "off" state, the TRIAC 612 will not be triggered and, therefore, is substantially non-conductive so that it delivers substantially no power from the line (L) to the load (Ld). Operation of the first and second triggering circuits 606 and 608, respectively, may be controlled by the processor 602 of the system and/or may be automatically enabled during a startup state using a default configuration. For example, during an envisioned default startup and transition states the first triggering circuit 606 may be enabled and the second triggering circuit 608 may be off until the processor 602 is activated and overrides the default settings. However, other configurations are also envisioned and may be stored in a memory of the system for later use.

OFF State

During the OFF state, both of the triggering circuits are deactivated and the TRIAC 612 does not substantially conduct so that substantially no power is transferred from the line (L) to the load 610.

With regard to power generated during this state, limited power (e.g., limited Vcc) may be generated by the power supply of the ZC 604 and may be used for limited uses such as, for example, to activate the first triggering circuit 606 and/or for sensing zero-crossing. Thus, basic operations such as selecting and/or enabling triggering circuits (606, 608) and/or detecting zero-crossings) may be enabled using the limited Vcc. However, the limited Vcc may be insufficient to operate certain internal circuits such as a wireless receiver, etc. However, the power supply may generate normal Vcc (for full operation of circuits of the dimmer) soon after startup such as, for example, when the load 610 is switched on.

START UP State

During the START UP state, the first triggering circuit 606 is activated by closing the CE switch 622 of the first triggering circuit 606 As the first triggering circuit 606 is similar to the charging circuit 218 shown in FIG. 2, it will reset itself when the line (L) voltage crosses zero-voltage (i.e., at every zero-crossing of the line (v) voltage) during every corresponding half-cycle and will trigger the TRIAC 612 to conduct and provide power to the load 610. Because the triggering circuit will fire/trigger the TRIAC 612 substantially symmetrically with respect to positive and negative cycles, it can be considered a self-balanced triggering circuit and may not require any additional zero-crossing detection circuits for correct phase timing with respect to the phase of the line (L) voltage waveform. Accordingly, the first triggering circuit 606 will switch on the load 610 by triggering the TRIAC 612 to conduct at a pre-defined phase angle (e.g., corresponding with charge time T1) at every half-cycle of the line (L) voltage after a zero-crossing is detected. After the load 610 is switched on, the impedance of the load 610 will stabilize, and, thereafter, the ZC circuit 604 of the dimmer may be able to determine accurate zero-crossing information. Thereafter, the information related to the zero-crossing may be provided to the processor 602 for detecting the zero-crossings of line voltage. As soon as the zero-crossing information is provided to processor 602, the processor 602 detects a zero-crossing and may activate the second triggering circuit 608 and can control the second triggering circuit 608 to cut an AC signal of the line (L) at a determined phase angle so as to control dimming of the load 610. This predetermined phase angle may be set by the system and/or the user in real time. For example, the predetermined phase angle may be set by the system in accordance with the dimming level and a current operating phase of the dimmer.

Because of the relatively high impedance of a ballast during start up and the relatively low impedance of a ballast during normal operation, the operation of the dimmer may be separated into two states of operation. During each different state, a different one of the first and second triggering circuits is activated independently of the other. Table 1 is a triggering circuit selection table for selecting the first and second triggering circuits. The processor 602 may refer to this table to select (e.g., stored in a memory of the processor) for enabling a triggering circuit (606, 608). The first triggering circuit 606 may be referred to as U1 and the second triggering circuit 608 may be referred to as U2.

TABLE 1

| TRIGGERING CIRCUIT | OPERATION STATES | | | |
|---|---|---|---|---|
| | OFF STATE OFF | ON STATES | | |
| | | STARTUP (AFTER OFF STATE) | TRANSI- TION | DIMMING |
| FIRST (U1) | Disabled | Enabled | Enabled | Disabled |
| SECOND (U2) | Disabled | Disabled | Disabled | Enabled (Modulated) |

Referring back to the startup state, during this state the first triggering circuit 606 is activated. Before start up, the power supply of the ZC circuit 604 may generate low voltage power from coupling to the line (L) and load (Ld) terminals. Thereafter, as soon as power output of the dimmer is stable and device is commanded to switch on (e.g., via the user interface), the processor 602 will enable the CE switch 622 to enable the first triggering circuit 606 Thereafter, the capacitor 628 will start to charge from 0V after a zero-crossing of line (L) voltage. When the voltage across the capacitor 628 is equal to or greater than (i.e., exceeds) the breakdown voltage of the DIAC 626, the DIAC will pass a triggering current (It) from the capacitor 628 to trigger the TRIAC 612 and a load 610 will be connected across the line (L) and neutral (N). Thereafter, as soon as the AC current passing through the TRIAC 612 decreases below a holding current of the TRIAC 612, the TRIAC 612 will become non-conductive and the load (Ld) is electronically decoupled (or substantially decoupled) from the line (L). Thereafter, a reverse charge on the capacitor 628 will charge the capacitor 628 in a similar manner as discussed above and, when the charge of the capacitor 628 is equal to or greater than (i.e., exceeds) the breakdown voltage of the DIAC 626, the DIAC 626 will pass a triggering current (It) from the capacitor 628 to trigger the TRIAC 612 and the load 610 is connected across the line (L) and neutral (N) just as discussed during the previous half-cycle. In this way, the load is switched on every half-cycle of the line (L) voltage automatically. Further, in accordance with embodiments of the present system, assuming the charge time for the capacitor 628 (charged by the current first triggering circuit 606) until it reaches a voltage which is greater than a breakdown voltage of the DIAC 626 is 8 ms (i.e., T1) and that the dimmer is in a minimum dimming state, an output of the load may appear as illustrated in FIG. 8 which is a graph of line (L) voltage (V line) with respect to a load voltage (V load) after startup in accordance with embodiments of the present system.

TRANSITION State

Figure 8:
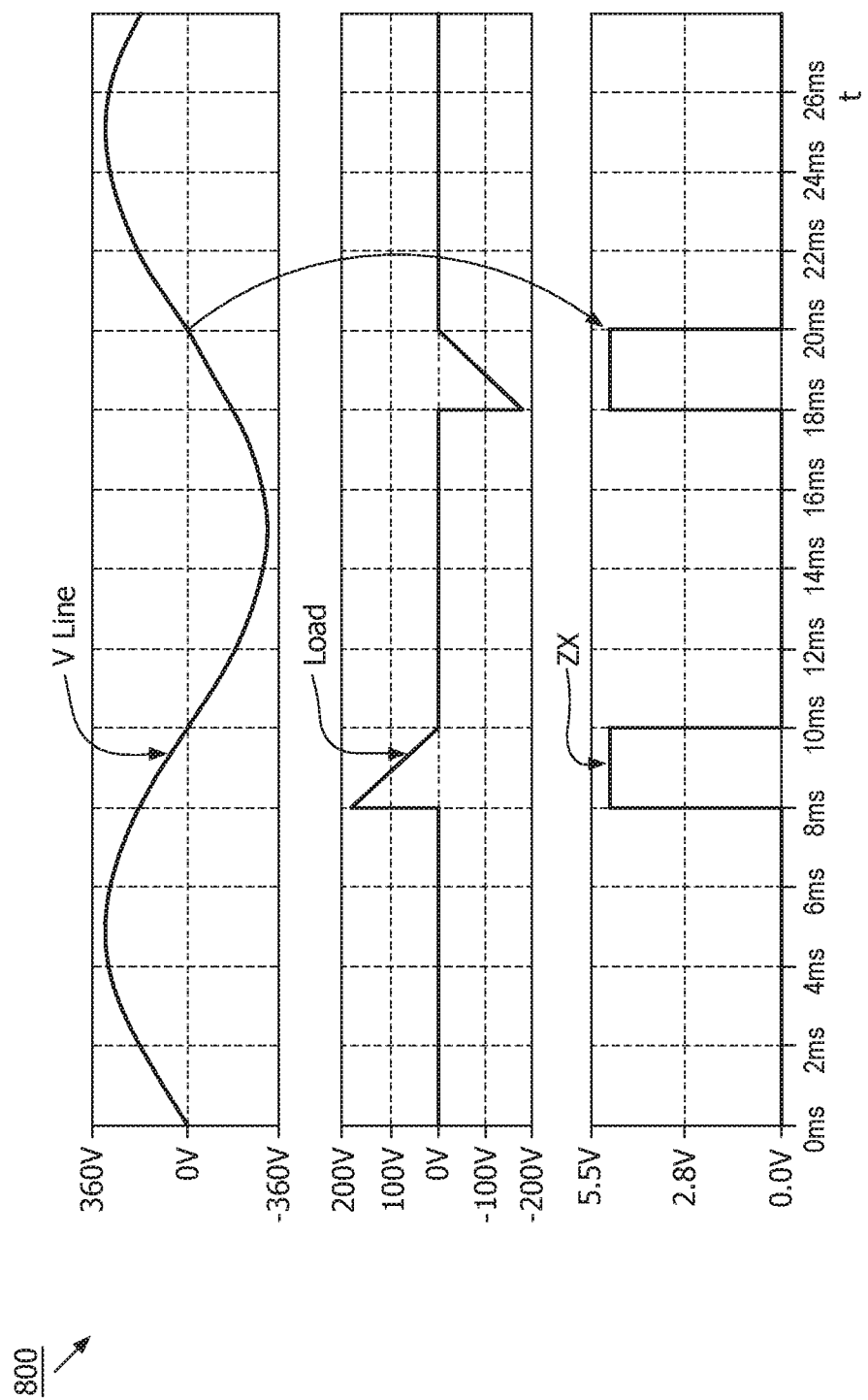
FIG. 8 shows a graph of line (L) voltage (V line) with respect to a load voltage (V load) waveform after startup in accordance with embodiments of the present system.

Referring to FIG. 8, as soon as the load 610 is switched on (e.g., at 8 ms), the load voltage (V load) will stabilize and have a forward phase cut across the load 610 (e.g., see, 8-10 ms). Using this stable voltage (i.e., V load at 8-10 ms), the ZC 604 can generate a ZX signal portion of the ZCI which is in phase with the line (L) voltage (V line) and whose falling edges corresponds with a zero-crossing of the line (L) voltage (V line).

DIMMING State

Figure 10:
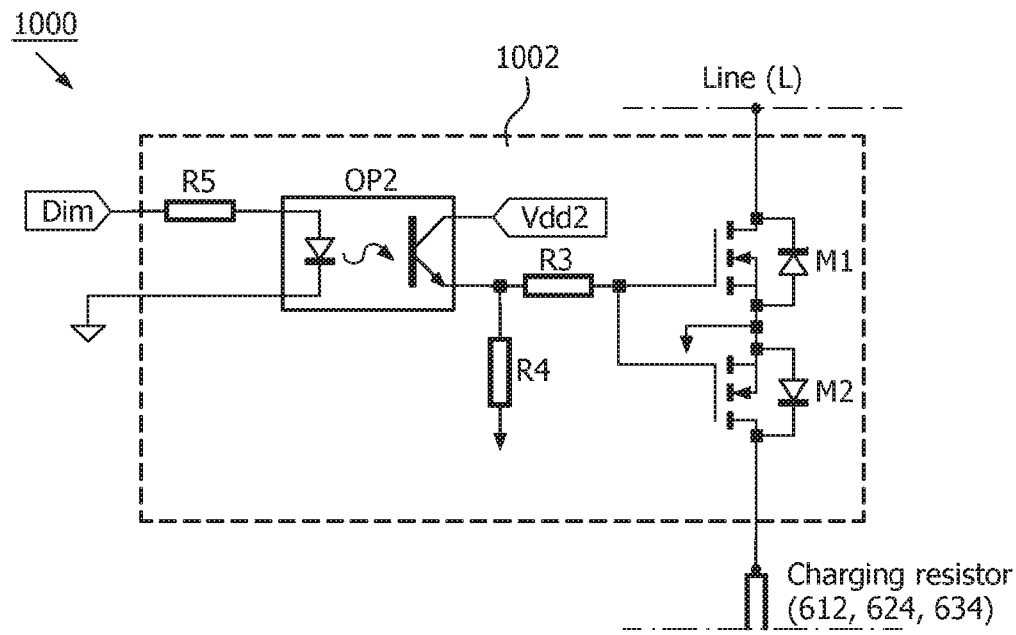
FIG. 10 shows a portion of a triggering circuit including a switch in accordance with embodiments of the present system.

After the start up and transition states, the ZX signal will be included in the ZCI and transmitted to the processor 602 which will then process the ZCI to determine zero-crossings of line (L) voltage and will generate a corresponding DIM signal to enable (e.g., activate) the second triggering circuit 608 at specific times relative to a corresponding zero-crossing of the line (L) voltage. Additionally, in this state, the processor 602 may form an SW signal to disable (e.g., deactivate) the first triggering circuit 606. Accordingly, the dimmer operates as a digital dimmer (as opposed to a hybrid-analog dimmer as discussed during startup) and may sample the dimming settings (e.g., entered by the user via the UI) and adjust the timing (i.e., to modulate) of the DIM signal to adjust triggering of the TRIAC 612 with respect to a phase of the line (L) voltage. By adjusting timing of the DIM signal, the timing of the firing of the TRIAC 612 may be adjusted to adjust power output to the load 610. As the DIM signal is transmitted for each half-cycle to the CE switch 632, the CE switch 632 should have sufficient operating speed and should be robust to handle the frequent switching during each half-cycle of the line (L) voltage. Accordingly, in embodiments of the present system, the CE switch 632 may include one or more high-speed semiconductor switches such as metal-oxide field-effect transistors (MOSFETs) and the like as illustrated in FIGS. 10 through 11B below. Further, the switch 622 of the first triggering circuit 606 may be similarly configured, if desired.

Figure 9:
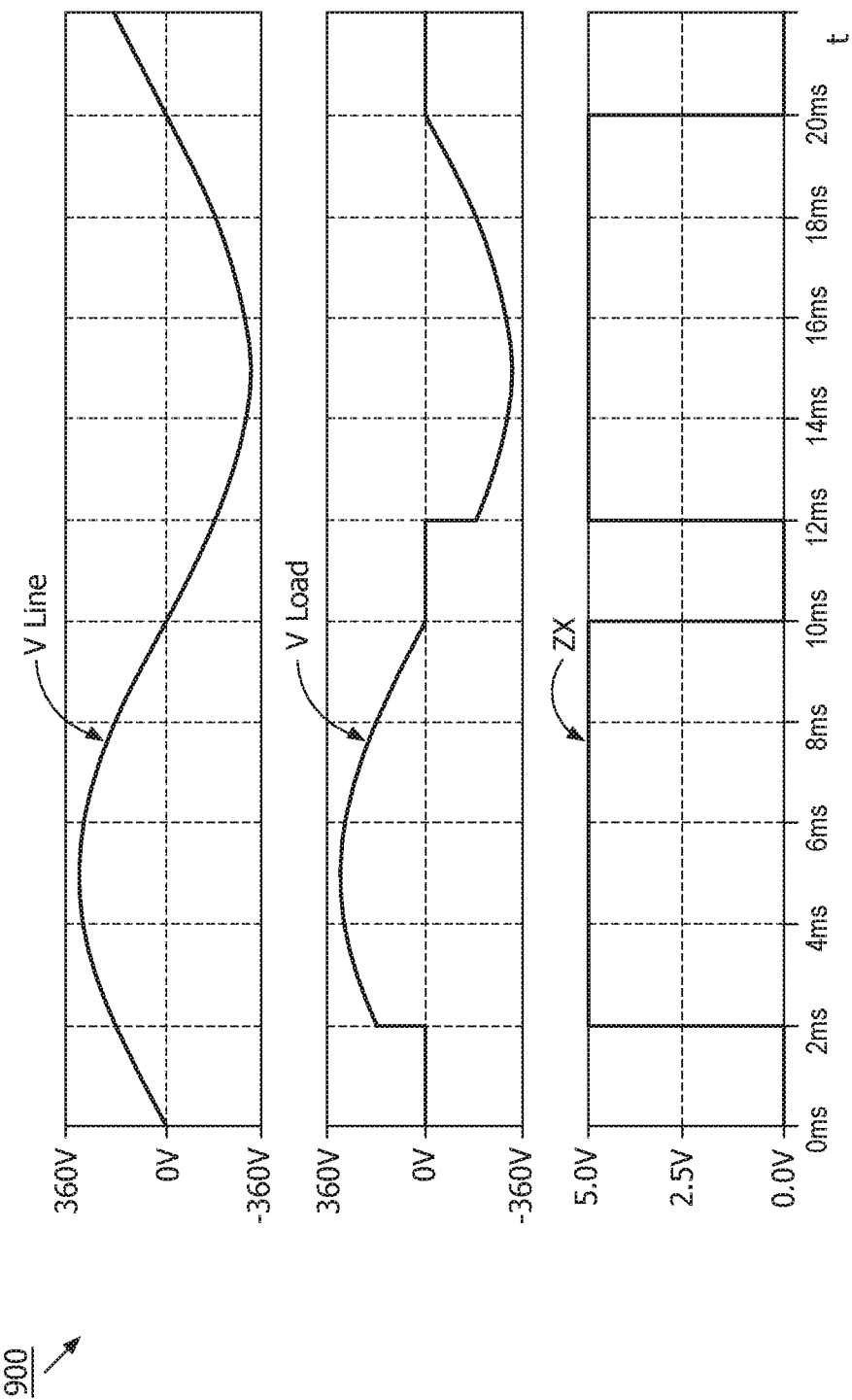
FIG. 9 is a graph of line (L) voltage (V line) with respect to a load voltage (V load) waveform during the dimming state in accordance with embodiments of the present system.

FIG. 9 is a graph of line (L) voltage (V line) with respect to a load voltage (V load) during the dimming state in accordance with embodiments of the present system. In accordance with the timing of FIG. 9, the TRIAC 612 is fired 2 ms after a corresponding zero-crossing of the line (L) voltage. The operation of the dimmer at this time may be considered to be stable and firing angle of the TRIAC 612 may be adjusted to a desired angle with respect to line (L) voltage to output power in accordance with a predetermined dimming level.

FIG. 10 shows a portion of a triggering circuit 1000 including a switch 1002 in accordance with embodiments of the present system. The switch 1002 may be formed using suitable semiconductor switches such as MOSFETS or the like and may be substituted for the switches 622 and 632 in the first or second triggering circuits 606 and 608, respectively.

Figure 11A:
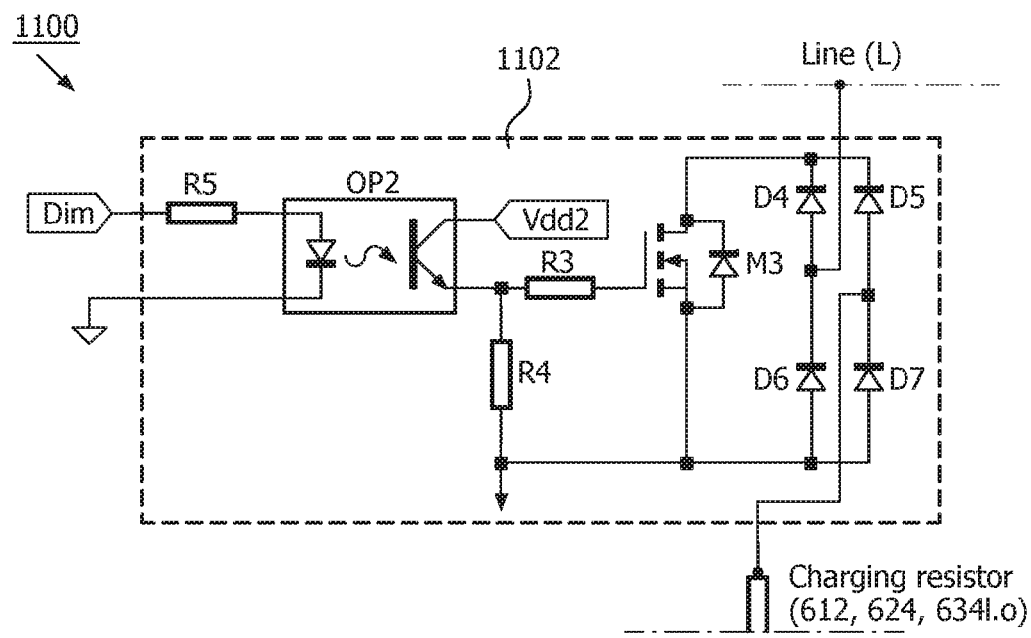
FIG. 11A shows a portion of a triggering circuit including a switch in accordance with embodiments of the present system.
Figure 11B:
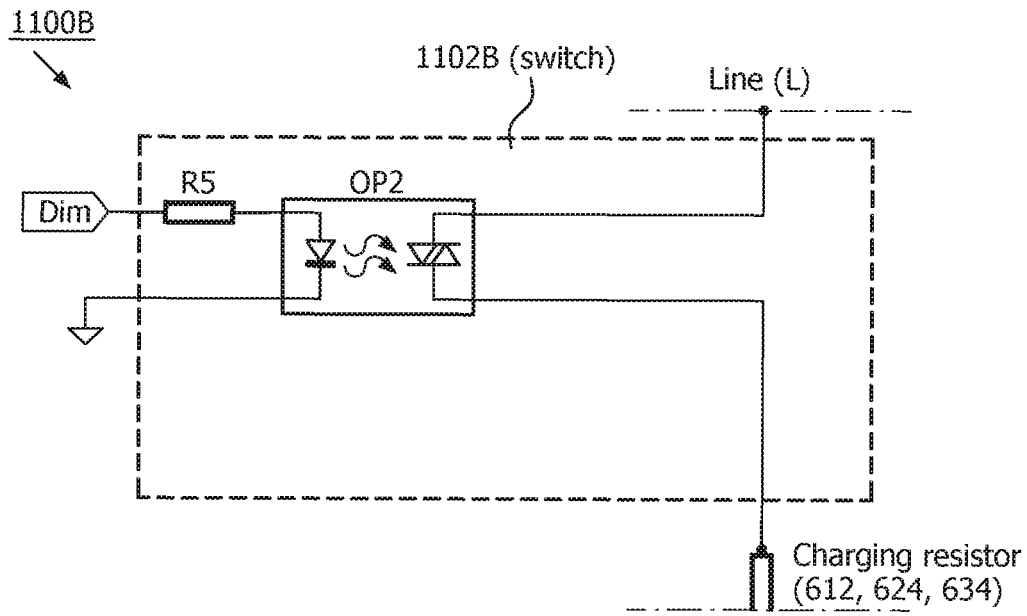
FIG. 11B shows a portion of a triggering circuit including a switch in accordance with embodiments of the present system.

FIG. 11A shows a portion of a triggering circuit 1100A including a switch 1102 in accordance with embodiments of the present system. The switch 1102 may be formed using suitable semiconductor switches such as MOSFETS or the like and may be substituted for the switches 622 and 632 in the first or second triggering circuits 606 and 608, respectively.

FIG. 11B shows a portion of triggering circuit 1100B including a switch 1102B in accordance with embodiments of the present system. The switch 1202B may be formed using suitable semiconductor switches such as photo-diac or the like and may be substituted for the switches 622 and 632 in the first and/or second triggering circuits 606 and 608, respectively.

However other switches and/or relays are also envisioned. For example, as the first triggering circuit 606 does not trigger the TRIAC instantaneously (i.e., with little delay) as does the second triggering circuit 608, it is envisioned that the first triggering circuit 606 may employ a low-speed switching device such as a relay or the like for the CE switch 622.

Accordingly, the present system discloses a two-wire microprocessor-controlled dimmer suitable for lamp drivers such as an LED driver and/or a fluorescent driver (e.g., a fluorescent ballast) having a varying impedance which is not stable during one or more operation states. In accordance with embodiments of the present system, the dimmer may include dual triggering circuits operable to trigger a controllable bidirectional semiconductor switch for alternating current such as a TRIAC. Further a method of operation of the dimmer of the present system is also disclosed.

Figure 12:
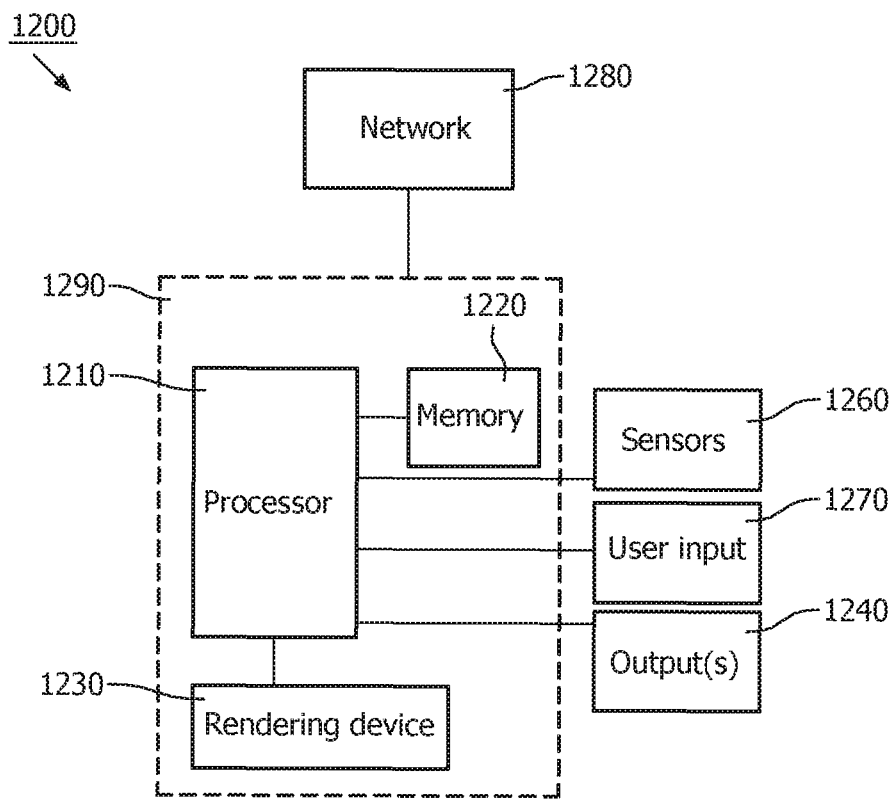
FIG. 12 shows a portion of a system in accordance with an embodiment of the present system.

FIG. 12 shows a portion of a system 1200 in accordance with embodiments of the present system. For example, a portion of the present system may include a processor 1210 (such as the processor 602) operationally coupled to one or more of a memory 1220, a rendering device (e.g., a display, a speaker, light emitting diodes (LED), etc.) 1230, sensors 1260, outputs 1240 (e.g., SM, DIM, etc.), and a user input device 1270. The memory 1220 may be any type of device for storing application data as well as other data related to the described operation. The sensors 1260 may include one or more of amplitude and/or phase sensors such as a zero-crossing sensor which may provide information (e.g., ZCI) related to characteristics such as amplitude, waveform, and/or phase of line (L) voltage (e.g., V line) and/or load (e.g., V-load) voltage waveforms. The application data and other data are received by the processor 1210 for configuring (e.g., programming) the processor 1210 to perform operation acts in accordance with the present system. The processor 1210 so configured becomes a special purpose machine particularly suited for performing in accordance with the present system.

The operation acts may include controlling operation of the dimmer. The user input device 1270 may receive a dimming selection from a user. The user input device 1270 may include, for example, a switch such as a toggle switch, a rotary switch, a rocker switch, a pushbutton switch, a sliding switch, a touchpad, a keyboard, or other device, including touch sensitive displays, which may be stand alone or be a part of a system, such as part of a dimmer, a light unit, or other device for communicating with the processor 1210 via any operable link. The user input device 1270 may be operable for interacting with the user and/or the processor 1210 including enabling interaction within a UI as described herein. The processor 1210 may also receive a dimming selection via any operable link such as a wireless lighting control link. Clearly the processor 1210, the memory 1220, display 1230 and/or user input device 1270 may all or partly be a portion of a computer system or other device such as a client and/or server as described herein.

The methods of the present system are particularly suited to be carried out by a computer software program, such program containing modules corresponding to one or more of the individual steps or acts described and/or envisioned by the present system. Such program may of course be embodied in a computer-readable medium, such as an integrated chip, a peripheral device or memory, such as the memory 1220 or other memory coupled to the processor 1210.

The program and/or program portions contained in the memory 1220 configure the processor 1210 to implement the methods, operational acts, and functions disclosed herein. The memory 1220 may be distributed, for example between the clients and/or servers, or local, and the processor 1210, where additional processors may be provided, may also be distributed or may be singular. The memory 1220 may be implemented as electrical, magnetic or optical memory, or any combination of these or other types of storage devices. Moreover, the term "memory" should be construed broadly enough to encompass any information able to be read from or written to an address in an addressable space accessible by the processor 1210. With this definition, information accessible through a network is still within the memory 1220, for instance, because the processor 1210 may retrieve the information from the network for operation in accordance with embodiments of the present system.

The processor 1210 is operable for providing control signals and/or performing operations in response to input signals from the user input device 1270, the sensors 1260, as well as in response to other devices of a network (e.g., a central or distributed lighting controller, etc.) and executing instructions stored in the memory 1220. The processor 1210 may be an application-specific or general-use integrated circuit(s). Further, the processor 1210 may be a dedicated processor for performing in accordance with the present system or may be a general-purpose processor wherein only one of many functions operates for performing in accordance with the present system. The processor 1210 may operate utilizing a program portion, multiple program segments, or may be a hardware device utilizing a dedicated or multi-purpose integrated circuit.

Further variations of the present system would readily occur to a person of ordinary skill in the art and are encompassed by the following claims.

Finally, the above-discussion is intended to be merely illustrative of the present system and should not be construed as limiting the appended claims to any particular embodiment or group of embodiments. Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow. In addition, the section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

What is claimed is:

1. A dimmer switch adapted to be coupled to an alternating current (AC) source and to a load so as to control an amount of power delivered from the AC source to the load, the dimmer switch comprising:

a controllable bidirectional semiconductor switch (CBSS) coupled between the AC source and the load and having a control line (G) which, when triggered, configures the CBSS to conduct so as to deliver a controlled amount of power from the AC source to the load for a corresponding half-cycle of the AC source;

first and second triggering circuits coupled to the control line and configured to trigger the CBSS; and a controller which:

receives sense information related to characteristics of the AC source, the characteristics including information related to one or more zero-crossings for one or more half cycles of a voltage waveform of the AC source, selects one the first or second triggering circuits to be enabled based upon one or more of the sense information, an operational state of the dimmer, and a dimming selection, and enables the selected first or second triggering circuit to charge wherein when the selected first or second triggering circuit reaches a threshold charge, the selected first or second triggering circuit triggers the CBSS to conduct for a corresponding half-cycle of the one or more half cycles and deliver power from the AC source to the load, wherein the threshold charge is reached substantially when the charge time of the corresponding first or second triggering circuit elapses.

2. The dimmer switch of claim 1, wherein the charge time for each for each of the first and second triggering circuits is different from each other.

3. The dimmer switch of claim 1, wherein the dimmer switch comprises only a source line coupled to the AC source and a load line coupled to the load as an input and an output of the dimmer switch, respectively.

4. The dimmer switch of claim 1, further comprising a capacitor coupled to both of the first and second triggering circuits, wherein when charging, at least one of the first and second triggering circuits charge the capacitor.

5. A method of operating a dimmer switch coupled to an alternating current (AC) source and a load so as to control an amount of power delivered from the AC source to the load, the method comprising acts which are performed by a processor, the acts comprising:

receiving sense information related to characteristics of the AC source, the characteristics including information related to one or more zero-crossings for one or more half cycles of a voltage waveform of the AC source;

selecting the first or second triggering circuits based upon one or more of the sense information, an operational state of the dimmer, and dimming selection; and enabling the selected first or second triggering circuit to charge, wherein when the selected first or second triggering circuit reaches a threshold charge, the selected first or second triggering circuit triggers a controllable bidirectional semiconductor switch (CBSS) to conduct for the corresponding half-cycle of the AC source and deliver power from the AC source to the load, wherein the threshold charge is reached substantially when the charge time of the corresponding first or second triggering circuit elapses.

6. The dimmer switch of claim 5, wherein the charge time for each of the first and second triggering circuits is set to be different from the other.

7. The method of claim 5, wherein the act of enabling the selected first or second triggering circuit to charge further comprises an act of modulating the enabling in accordance with one or more of the sense information, an operational state of the dimmer, and the dimming selection.

8. The method of claim 5, further comprising an act of disabling the triggering circuit which is not the selected triggering circuit of the first and second triggering circuits.

9. The method of claim 5, further comprising an act of determining a selected dimming state of first and second dimming states in accordance with the dimming selection.

10. The method of claim 9, the further comprising an act of selecting one of the first and second triggering circuits in the first dimming state and selecting the other of the first and second triggering circuits in the second dimming state.

11. A computer program stored on a computer readable non-transitory memory medium, the computer program configured to operate a dimmer switch (coupled to an alternating current (AC) source and a load so as to control an amount of power delivered from the AC source to the load, the computer program comprising:

a program portion configured to:

receive sense information related to characteristics of the AC source, the characteristics including information related to a zero-crossing of a voltage waveform of the AC source;

select first or second triggering circuits based upon one or more of the sense information, an operational state of the dimmer, and user input information; and enable the selected first or second triggering circuits to charge, wherein when the selected first or second triggering circuit reaches a threshold charge, the selected first or second triggering circuit triggers a controllable bidirectional semiconductor switch (CBSS) to conduct for the corresponding half-cycle of the AC source and deliver power from the AC source to the load, wherein the program portion is further configured to receive the dimming selection from a user interface of the dimmer switch.

12. The computer program of claim 11, wherein the program portion is further configured to modulate the enabling of the selected first or second triggering circuit in accordance with one or more of the sense information, an operational state of the dimmer, and a dimming selection.

13. The computer program of claim 11, wherein the program portion is further configured to disable the triggering circuit which is not the selected triggering circuit of the first and second triggering circuits.

14. The computer program of claim 11 wherein the program portion is further configured to determine a selected dimming state of first and second dimming states in accordance with the dimming selection.

15. A dimmer switch adapted to be coupled to an alternating current (AC) source and to a load so as to control an amount of power delivered from the AC source to the load, the dimmer switch comprising:

a controllable bidirectional semiconductor switch (CBSS) coupled between the AC source and the load and having a control line (G) which, when triggered, configures the CBSS to conduct so as to deliver a controlled amount of power from the AC source to the load for a corresponding half-cycle of a plurality of half-cycles of the AC source;

first and second triggering circuits coupled to the control line and configured to trigger the CBSS, the first triggering circuit being a self balancing triggering circuit configured to trigger the CBSS to conduct for a corresponding half-cycle of the one or more half cycles and deliver power from the AC source to the load when the first triggering circuit reaches a threshold charge; and a controller which:
- receives sense information related to characteristics of the AC source, the characteristics including information related to a voltage waveform of the AC source,
- senses a zero-crossing of the voltage waveform of the AC source for at least one half-cycle of the plurality of half-cycles in accordance with the sense information,
- determines a delay period for phase cut for the at least one half cycle of the plurality of half-cycles in accordance with the sense information and a dimming selection,
- determines whether the delay period has elapsed, and
- enables the second triggering circuit to trigger the CBSS for the at least one half-cycle of the plurality of half-cycles when it is determined that the delay period has elapsed, and
- selectively disables the first triggering circuit.

* * * * *